United States Patent
Ito et al.

(10) Patent No.: US 11,498,417 B2
(45) Date of Patent: Nov. 15, 2022

(54) CHECK VALVE FOR FUEL TANK AND MANUFACTURING METHOD THEREFOR

(71) Applicant: TOYODA GOSEI CO., LTD., Kiyosu (JP)

(72) Inventors: Yukihiro Ito, Kiyosu (JP); Atsuki Yamaguchi, Kiyosu (JP); Hiroaki Kito, Kiyosu (JP); Mitsuhiro Buichi, Nagoya (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 587 days.

(21) Appl. No.: 16/555,232

(22) Filed: Aug. 29, 2019

(65) Prior Publication Data

US 2020/0086737 A1 Mar. 19, 2020

(30) Foreign Application Priority Data

Sep. 18, 2018 (JP) .............................. JP2018-173810

(51) Int. Cl.
*B60K 15/04* (2006.01)
*B60K 15/035* (2006.01)
(Continued)

(52) U.S. Cl.
CPC ........ *B60K 15/0403* (2013.01); *B60K 15/035* (2013.01); *B60K 15/03006* (2013.01); *B60K 15/04* (2013.01); *B60K 15/05* (2013.01); *B60K 2015/03019* (2013.01); *B60K 2015/03026* (2013.01); *B60K 2015/0346* (2013.01);
(Continued)

(58) Field of Classification Search
CPC ....................... B60K 15/035; B60K 15/03006; B60K 15/05; B60K 2015/03019; B60K 2015/03026; B60K 2015/03523; B60K 15/04; B60K 15/0403; B60K 2015/0477; B60K 2015/03576
See application file for complete search history.

(56) References Cited

U.S. PATENT DOCUMENTS 4,044,913 A * 8/1977 Brunnert ................ B60K 15/04
251/303
7,171,749 B2 2/2007 Kaneko
(Continued)

FOREIGN PATENT DOCUMENTS

JP 2005-153693 A 6/2005
WO WO-2009019489 A1 * 2/2009 ............. B60K 15/04

*Primary Examiner* — Atif H Chaudry
(74) *Attorney, Agent, or Firm* — Posz Law Group, PLC

(57) ABSTRACT

There is provided a check valve for a fuel tank, including a cover to be welded to the fuel tank, a case welded to the cover and having a discharge port configured to discharge fuel into the fuel tank, and a valve body configured to open and close the discharge port. The cover includes a positioning portion on an outer circumferential surface. The case includes a vent hole which is arranged upward in a circumferential direction of the case when the check valve is mounted on the fuel tank, and a valve body supporting portion which supports the valve body inside the case. The valve body supporting portion includes a selecting portion for positioning the vent hole, which is provided on a discharge port side at a position away from the positioning portion by a predetermined angle in the circumferential direction of the case.

2 Claims, 8 Drawing Sheets

(51) Int. Cl.
*B60K 15/03* (2006.01)
*B60K 15/05* (2006.01)

(52) U.S. Cl.
CPC ............ *B60K 2015/03523* (2013.01); *B60K 2015/03576* (2013.01); *B60K 2015/0477* (2013.01)

(56) References Cited

U.S. PATENT DOCUMENTS

| | | | |
|---|---|---|---|
| 9,022,053 B2* | 5/2015 | Doble | B60K 15/04 285/137.11 |
| 2005/0121105 A1 | 6/2005 | Kaneko | |
| 2019/0061517 A1* | 2/2019 | Hagano | B60K 15/04 |

* cited by examiner

CHECK VALVE FOR FUEL TANK AND MANUFACTURING METHOD THEREFOR

CROSS-REFERENCE TO RELATED APPLICATIONS

This application is based upon and claims the benefit of priority from prior Japanese patent application No. 2018-173810, filed on Sep. 18, 2018, the entire contents of which are incorporated herein by reference.

TECHNICAL FIELD

Aspects of the present invention relate to a check valve for fuel tank and a manufacturing method therefor.

BACKGROUND ART

A check value for a fuel tank of an automobile includes a case having a discharge opening and a cover to be welded to the fuel tank (for example, refer to JP-A-2005-153693). In an operation of assembling the case and the cover, the case and the cover are welded while performing positioning using a rib or the like protruding from an outer periphery of the case. Accordingly, a communication hole which is formed in the case and functions as an air vent at the time of oil supplying can be arranged upward in a case circumferential direction when the check valve is mounted on the fuel tank, so that a constant oil supply performance can be ensured. FIG. 8 shows a welding method of the related-art check valve described above, and details thereof will be described later.

In recent years, an overall length of the case may be reduced in accordance with vehicle requirements and tank shapes. In this case, when the case and the cover are laser-welded, a laser beam intersects with a positioning rib, which may causes a decrease in welding strength. Further, under the influence of tank internalization where components for a fuel tank are mounted in a fuel tank, a mountable area of components and a surplus area in the periphery are limited. Accordingly, it may be difficult to arrange the positioning rib on the outer periphery of the case as described above.

SUMMARY

The present invention has been made in view of the above circumstances and provides the following check valve for a fuel tank and manufacturing method therefor.

(1) A check valve for a fuel tank includes: a cover which is to be welded to the fuel tank and has an inflow port configured to allow fuel to flow into the check valve; a case which is welded to the cover and has a discharge port configured to discharge the fuel into the fuel tank; and a valve body which is configured to open and close the discharge port. The cover includes a positioning portion on an outer circumferential surface. The case includes a vent hole which is to be arranged upward in a circumferential direction of the case when the check valve is mounted on the fuel tank, and a valve body supporting portion which supports the valve body inside the case. The valve body supporting portion includes a selecting portion for positioning the vent hole. The selecting portion is provided on a discharge port side of the valve body support portion at a position away from the positioning portion by a predetermined angle in the circumferential direction of the case.

According to the above check valve, since the selecting portion is formed inside of the case and formed on a discharge port side of the valve body support portion, while the related-art oil supply property is maintained, the laser beam and the selecting portion do not intersect, and stable welding strength can be ensured at the time of welding. Further, the vent hole can be arranged upward in a circumferential direction of the case without requiring no excessive mounting space in the tank when the check valve is mounted on the fuel tank. Further, by forming the selecting portion in the valve body support portion, the components can be shared without changing the related-art cover.

(2) In the above check valve for a fuel tank, the valve body supporting portion includes a connecting portion formed to extend from an inner circumferential surface of the case to a center thereof, and the selecting portion is provided on the connecting portion.

According to the above check valve, in addition to the same effect as the above check tank, since a degree of freedom of the shape of the selecting portion formed in the connecting portion is higher, assembling property is improved.

(3) In the above check valve, the selecting portion is formed on a discharge port side end surface of the connecting portion.

According to the above check valve, in addition to the same effect as the above check tank, the selecting portion can be disposed inside the check valve without interfering with the oil supply performance.

(4) A manufacturing method for a check valve for a fuel tank including a cover which is to be welded to a fuel tank, a case which is welded to the cover, a valve body which is supported by a valve body supporting portion of the case, includes: selecting an assembly position of a cover holder and the cover based on a positioning portion of the cover; selecting an assembly position of a case holder and the case based on a selecting portion of the valve body supporting portion; determining a welding position of the cover and the case; and welding the cover and the case.

According to the above manufacturing method for a check valve for a fuel tank, the selecting portion is formed inside the case. Accordingly, an assembling position of the cover and the case is determined without affecting the mounting space in the tank, and the vent hole can be arranged upward in the circumferential direction of the case when the tank of the check valve for a fuel tank is mounted. The laser beam and the selecting portion do not intersect at the time of welding, and stable assembly can be provided. Further, the assembling position of the cover and the case is selected, and the vent hole may be arranged upward of the fuel tank without interfering with the oil supply performance.

DESCRIPTION OF EMBODIMENTS

<Component Configuration>

Figure 1:
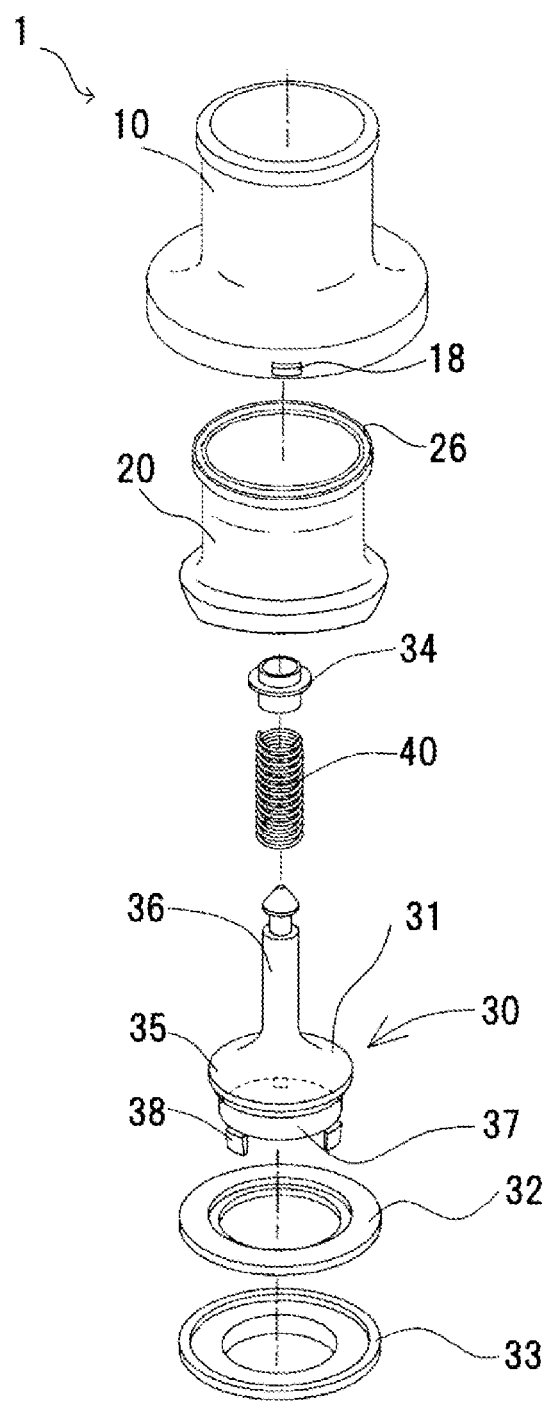
FIG. 1 is an exploded perspective view of a check value for a fuel tank according to an embodiment of the present invention.
Figure 2:
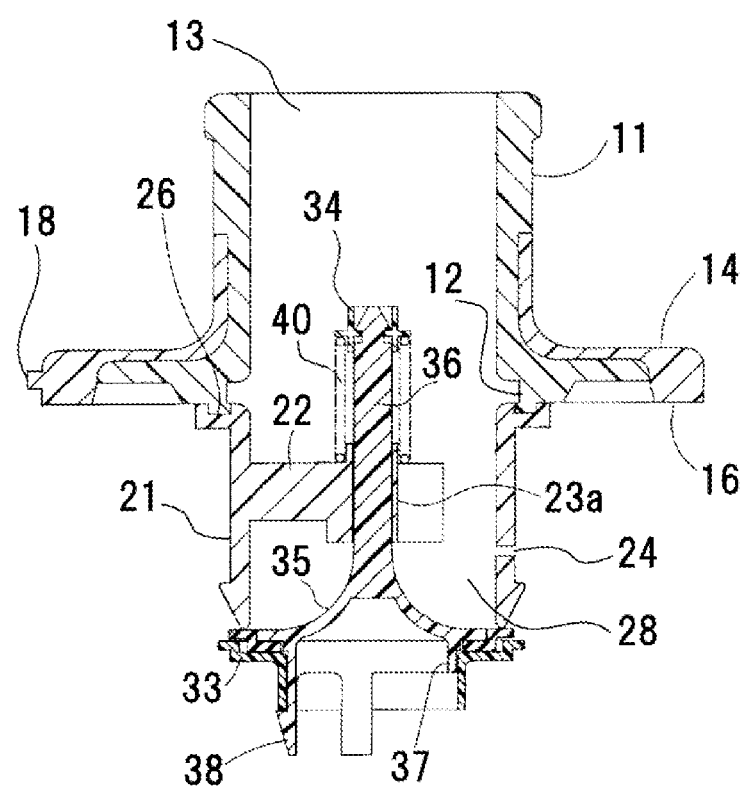
FIG. 2 is a partial sectional view of the check valve according to the embodiment of the present invention.
Figure 3:
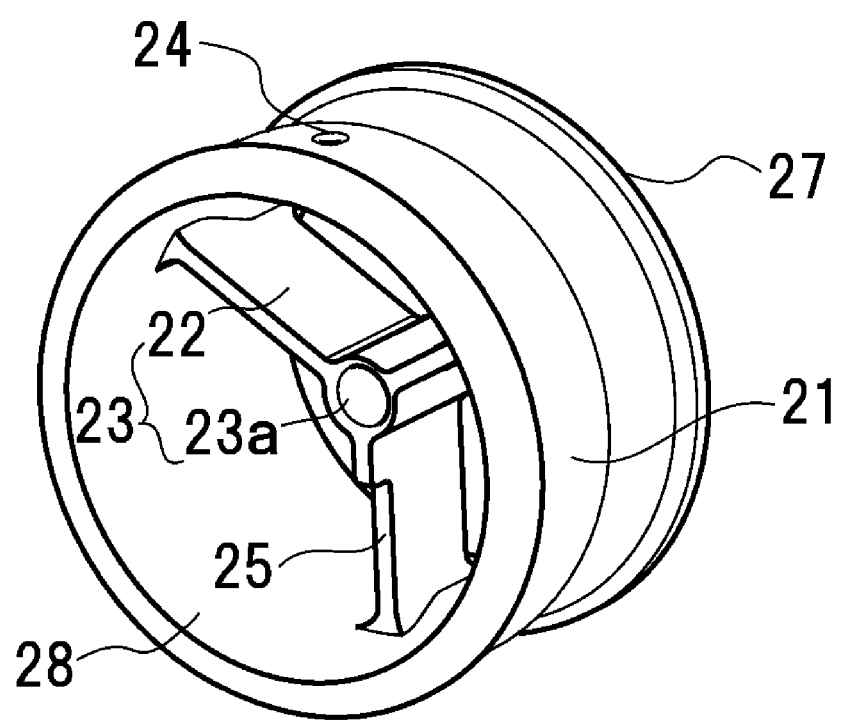
FIG. 3 is a perspective view of a component of the check valve according to the embodiment of the present invention.
Figure 4:
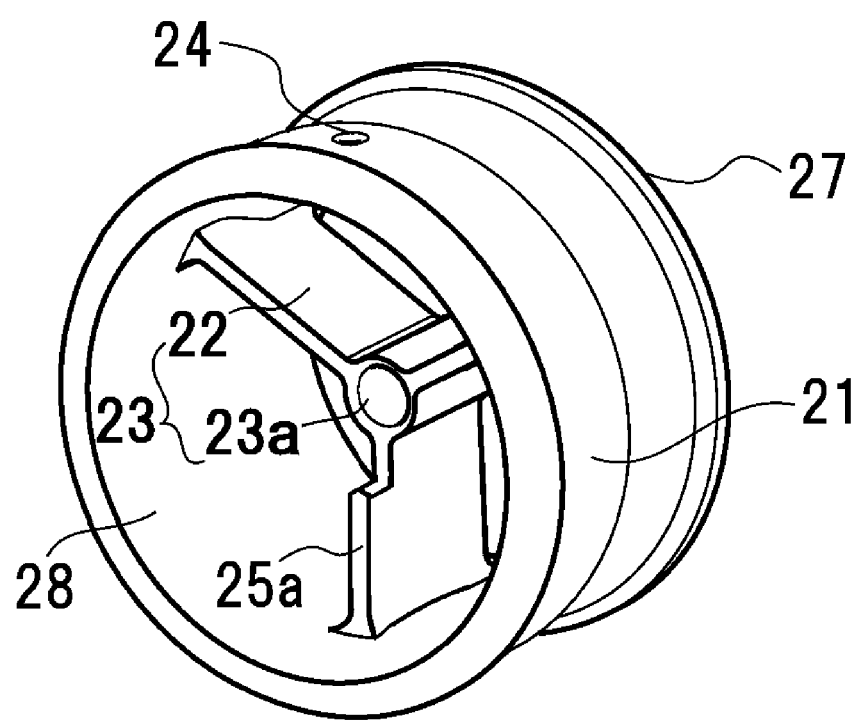
FIG. 4 is a perspective view of a component of the check valve according to the embodiment of the present invention.

FIG. 1 shows components of a check valve 1 for a fuel tank according to the present embodiment, and FIG. 2 shows a sectional view when the components are assembled. FIGS. 3 and 4 are enlarged partial views according to the present embodiment. In the sectional views, some sectional lines are omitted for easily viewing of the drawings.

As shown in FIGS. 1 and 2, the check valve 1 according to the present embodiment includes a cover 10, a case 20, a valve body 30, and a spring 40. The cover 10 is formed by two-color molding and includes an outer portion 14 which is formed of maleic acid-modified polyethylene, and an inner portion 11 which is formed of a glass fiber-filled polyamide. The outer portion 14 includes a ring-shaped tank welding portion 16 which is to be welded to the fuel tank, and a positioning portion 18 used for positioning at the time of welding the fuel tank. That is, when an operator welds the check valve 1 to the fuel tank, positioning of the check valve 1 in a circumferential direction is performed using the positioning portion 18 to determine the circumferential position of the check valve 1. The positioning portion 18 is formed in a rib shape protruding from the outer portion 14. The inner portion 11 includes an inflow port 13 through which supplied fuel flows into the check valve 1, and a case welding portion 12 which is a ring-shaped protrusion welded to the case 20.

The case 20 includes a cylindrical case body 21 formed of a polyamide which has less swelling property to the fuel, and a valve body supporting portion 23 which supports the valve body 30 inside the case body 21. The valve body 30 will be described later. The valve body supporting portion 23 extends from an inner circumferential surface of the case 20 in a center direction. The valve body supporting portion 23 includes three connecting portions 22 formed at equal intervals in the circumferential direction, and a cylindrical guide hole 23a which movably supports the valve body 30 (described later). One end of the case 20 includes a communication port 27 through which the supplied fuel flows, and a ring-shaped welding portion 26 welded to the case welding portion 12 of the cover 10. The welding portion 26 is formed in a groove shape to be fitted with the case welding portion 12. Another end of the case 20 includes a discharge port 28 which is configured to discharge the supplied fuel into the fuel tank. A vent hole 24 functioning as an air vent at the time of oil supplying is formed on an outer periphery of the case 20. The vent hole 24 is preferably arranged upward in the circumferential direction of the case, and more preferably disposed at an uppermost end of an outer circumferential surface of the case in a mounted state on the fuel tank.

As shown in FIGS. 2 and 3, a selecting portion 25 is formed in the connecting portion 22 by cutting out a part thereof on a discharge port side. The selecting portion 25 is formed at a position away from the positioning portion 18 of the cover 10 by a predetermined angle $\alpha$ in the circumferential direction of the case 20. The selecting portion 25 is formed to be also away from the vent hole 24 by a predetermined angle $\beta$ in the circumferential direction of the case 20. That is, by determining an assembling position of the selecting portion 25 and the positioning portion 18, an arrangement position of the vent hole 24 is relatively determined. In the present embodiment, the predetermined angle $\alpha$ is 0° and the predetermined angle $\beta$ is 180°. Although the selecting portion 25 may be formed in the guide hole 23a, since a degree of freedom of the shape of the selecting portion formed in the connecting portion 22 is higher, assembling property is improved.

The selecting portion 25 is formed on a discharge port side end surface of the connecting portion 22. In other words, the selecting portion 25 is formed so as not to be visible from an inflow port side. Accordingly, the selecting portion 25 can be arranged inside the check valve 1 without lowering an oil supply performance.

In the present embodiment, the selecting portion 25 is formed in one of the three connection portions 22, but may be formed in two of the three connecting portions 22. As shown in FIG. 4, the selecting portion 25 may be formed as a convex selecting portion 25a formed in a convex shape on the discharge port side.

As shown in FIGS. 1 and 2, the connecting portion 22 and the valve body supporting portion 23 support the valve body 30 which is configured to open and close the discharge port 28. The valve body 30 includes a valve body 31 and a shaft portion 36 formed of polyacetal, a flange portion 35 formed at one end of the shaft portion 36, a ring-shaped rubber seal seat 32, a perforated disk-shaped holding plate 33 formed of polyacetal, and a cap 34. The valve body 31 includes an inner cylindrical portion 37 protruding from the flange portion 35 to a side opposite to the shaft portion 36. Three claw portions 38 are formed at equal intervals in the circumferential direction on the inner cylindrical portion 37. In the valve body 31, when the claw portions 38 engage with the holding plate 33, the seal seat 32 is held between the flange portion 35 and the holding plate 33. The outer diameters of the seal seat 32 and the holding plate 33 are larger than that of the flange portion 35.

The valve body 30 is inserted into the guide hole 23a of the case 20 from the discharge port side, and the spring 40 is inserted into the shaft portion 36 penetrating the guide hole 23a. The cap 34 is fitted and fixed to the shaft portion 36, so that the spring 40 is held in a compressed state between the cap 34 and the valve body 30.

According to the above-described check valve 1 for a fuel tank of the embodiment, the selecting portion 25 is formed inside the case 10 and on the discharge port side of the connecting portion 22. Thus, while the related-art oil supply property is maintained, a laser beam and the selecting portion 25 do not intersect at the time of welding, and stable welding strength can be secured. Further, the vent hole 24 can be arranged upward in the circumferential direction of the case without requiring excessive mounting space in the tank when the check valve 1 is mounted on the fuel tank. Further, by forming the selecting portion 25 in the connecting portion 22, the components can be shared without changing the related-art cover 10.

<Manufacturing Method>

Figure 5:
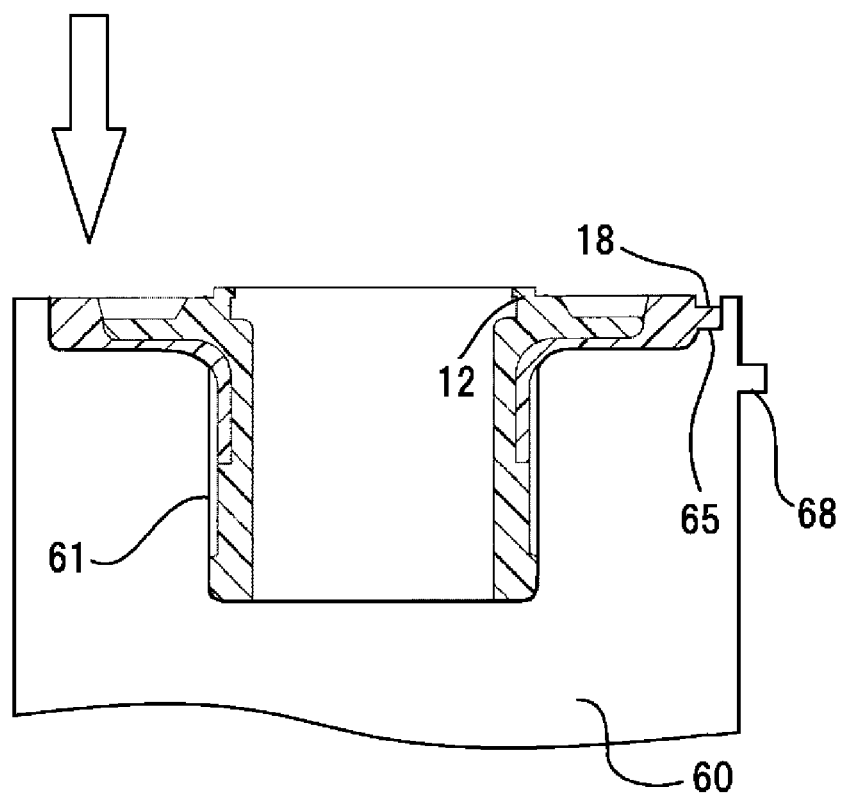
FIG. 5 is a sectional view showing a manufacturing method according to the embodiment of the present invention.
Figure 6:
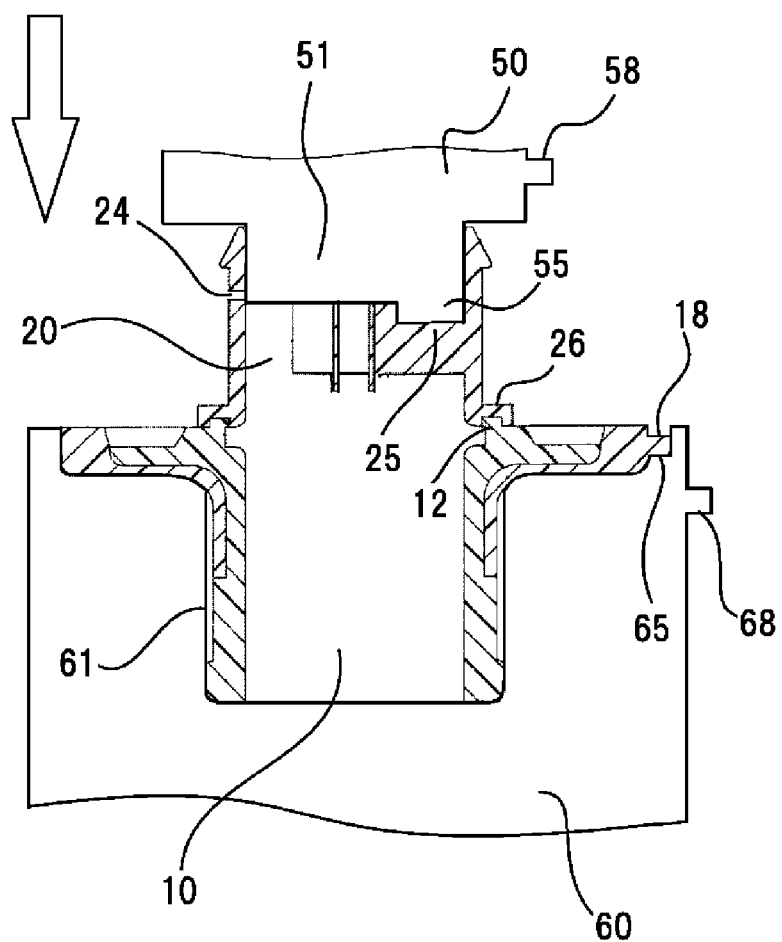
FIG. 6 is a sectional view showing the manufacturing method according to the embodiment of the present invention.

FIGS. 5 and 6 show an example of a manufacturing method for the check valve 1 for a fuel tank according to the present embodiment. The check valve 1 is assembled in a white arrow direction. Some sectional lines are omitted for easily viewing of the drawings.

As shown in FIGS. 5 and 6, a cover holder 60 holds the cover 10 in a holding groove 61. The holding groove 61 is a groove formed along an outer circumferential surface of the cover 10, and a part of the holding groove 61 includes a cover selected portion 65 which is positioned at and fitted with the positioning portion 18 of the cover 10. Since the cover selected portion 65 is formed so as to be fitted with the positioning portion 18, the cover selected portion 65 is formed in a groove shape.

The cover holder 60 includes a second positioning portion 68 protruding from an outer periphery of the cover holder 60, which will be described later. The cover holder 60 is generally called a jig and is preferably formed in a method that is easy for the operator to handle.

As shown in FIG. 6, a case holder 50 holds the case 20 by a holding cylindrical portion 51. The holding cylindrical portion 51 is formed along the inner circumferential surface of the case 20 and includes a selected portion 55 positioned at and fitted with the selecting portion 25 of the case 20 on a tip end surface thereof. The selected portion 55 is formed in a protruding shape to be fitted with the selecting portion 25. The selected portion may be formed in a groove shape in the case of the convex selecting portion 25a.

The case holder 50 includes a positioned portion 58 projecting from an outer periphery of the case holder 50, which will be described later. The case holder 50 is generally called a jig and is preferably formed in a manner that is easy for the operator to handle.

Figure 7:
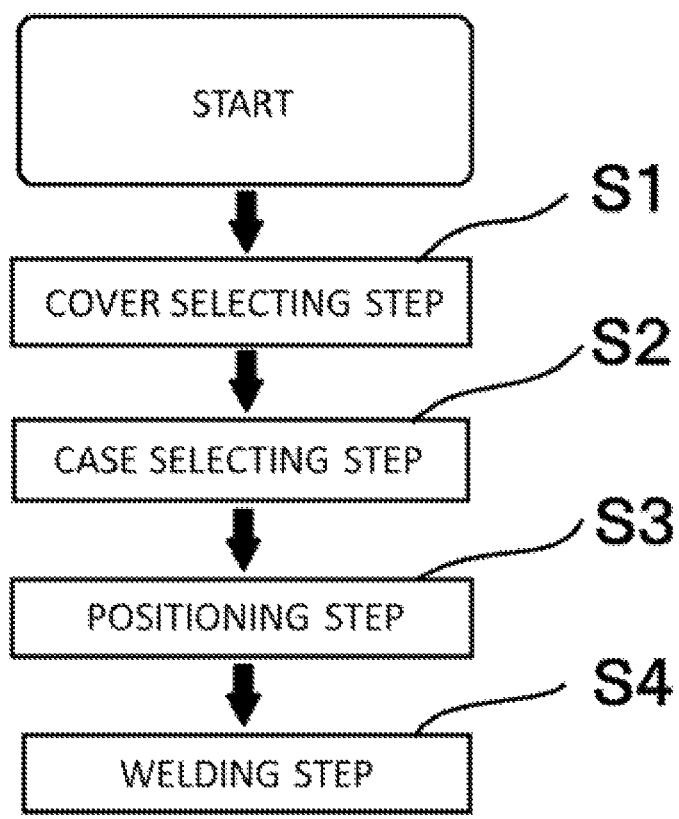
FIG. 7 is a flowchart of the manufacturing method according to the embodiment of the present invention.

The manufacturing method of the check valve 1 for a fuel tank according to the present embodiment mainly includes the following steps (A) to (D). FIG. 7 shows a flowchart of the manufacturing method according to the present embodiment.

(A) A cover selecting step S1 of selecting an assembling position of the cover 10 and the cover holder 60

(B) A case selecting step S2 of selecting an assembling position of the case 20 and the case holder 50

(C) A positioning step S3 of determining a welding position of the cover 10 and the case 20

(D) A welding step S4 of welding the cover 10 and the case 20

FIG. 5 shows the cover selecting step S1. In the cover selecting step S1, the cover selected portion 65 of the cover holder 60 is assembled and fitted with the positioning portion 18 of the cover 10, so that a positional relationship between the cover 10 and the cover holder 60 is selected.

FIG. 6 shows the manufacturing method after the cover selecting step. In the case selecting step S2, a temporary setting is performed by aligning the case welding portion of the cover 10 and the welding portion 26 of the case 20. Thereafter, a positional relationship between the case 20 and the case holder 50 is selected by assembling and fitting the selected portion 55 of the case holder 50 with the selecting portion 25 of the case 20.

As shown in FIG. 6, in the positioning step S3, a positional relationship between the second positioning portion 68 of the cover holder 60 set at a predetermined position by the cover selecting step S1 and the positioned portion 58 of the case holder 50 determined at a predetermined position by the case selecting step S2 is determined. Accordingly, a positional relationship between the case 20 and the cover 10 is determined, and a positional relationship between the positioning portion 18 of the cover 10 and the vent hole 24 is also determined. It is preferable that a method of determining the positional relationship between the second positioning portion 68 and the positioned portion 58 be appropriately selected by a method that is easy for the operator to handle by using jig or a laser beam indicating an assembling position or the like.

As described above, the positional relationship between the positioning rib 18 and the vent hole 24 is determined in the positioning step S3. Thus, the positioning portion 18 is aligned with a positioning portion (not shown) on a fuel tank side, and the vent hole 24 can be arranged upward in the circumferential direction of the case when the check valve 1 is mounted on the fuel tank. That is, the second positioning portion 68 and the positioned portion 58 are formed in the cover holder 60 and the case holder 50 respectively so as to define the positional relationship between the positioning rib 18 and the vent hole 24. That is, the vent hole 24 is formed to be able to be arranged upward in the circumferential direction of the case when the check valve 1 is mounted on the fuel tank.

After the positional relationship between the cover 10 and the case 20, more specifically, the positional relationship between the positioning portion 18 and the vent hole 24 is determined in the positioning step S3, two components are welded in the welding step S4. The welding method is preferably laser welding, and welding is performed by irradiating the ring-shaped case welding portion 12 and the ring-shaped welding portion 26 subjected to the temporary setting.

According to the manufacturing method for the check valve 1 for a fuel tank in the embodiment described above, the selecting portion 25 is formed inside the case 20. Accordingly, an assembling position of the cover 10 and the case 20 is determined without affecting the mounting space in the tank, and the vent hole 24 can be arranged upward in the circumferential direction of the case when the check valve 1 is mounted on the fuel tank. Further, the laser beam and the selecting portion 25 do not intersect at the time of welding, and stable assembly can be provided. Further, the assembling position of the cover 10 and the case 20 is selected, and the vent hole 24 may be arranged upward of the fuel tank without deteriorating the oil supply performance.

Reference Example

Figure 8:
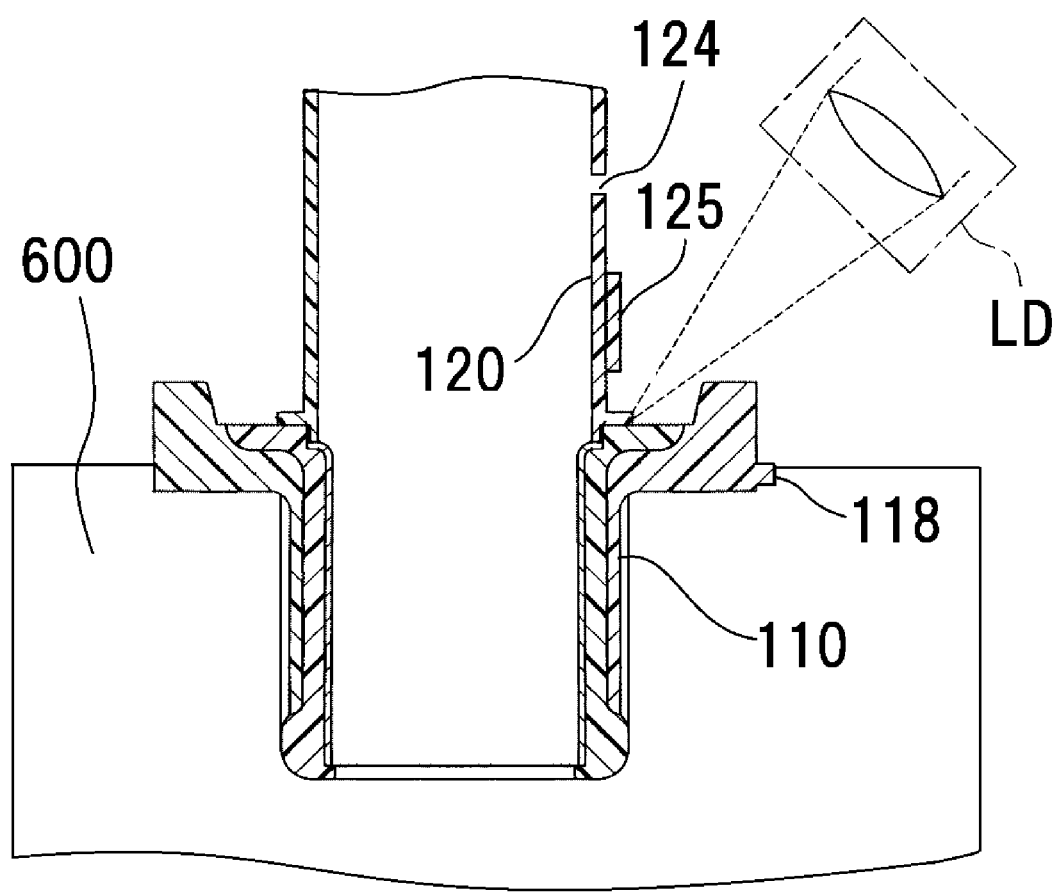
FIG. 8 is a sectional view of a related-art check valve for a fuel tank.

FIG. 8 shows a welding method of a cover 110 and a case 120 held by a cover holder 600 in a related-art check valve 100 for a fuel tank. In this related-art check valve 100, the case 120 and the cover 110 are positioned by using a rib 125 and a positioning portion 118 formed on the outer periphery of the case 120, and a communication hole 124 is determined at a predetermined position by welding with the laser beam emitted from a laser irradiation device LD. However, as described above, the formation of the rib on the outer periphery as in the related-art check valve is not preferable in recent years for incorporating the tank. Further, in the case 10 of the present embodiment which is shortened by about 30 mm compared to the related-art check valve, it is assumed that the rib 125 intersects with the laser beam when welded in the related-art manner.

First Modification

In the manufacturing method of the present embodiment, the positional relationship between the positioning portion 18 and the vent hole 24 may be determined without using the selected portion 65 of the cover holder 60. Specifically, the cover selecting step S1 is not performed, the case selecting step S2 is performed in the similar manner as in the embodiment, and the positioning step S3 is performed by the positioning portion 18 of the cover 10 and the positioned portion 58 of the case holder 50. In this modification, an equivalent effect as that of the embodiment can be expected to be obtained.

Second Modification

In the cover selecting step S1, the positioning portion 18 and the cover selected portion 65 are not in the fitting shape, but may use a mark such as a marker or a laser beam. It is preferable that the manner is appropriately selected by a method that is easy for the operator to handle.

The present invention is not limited to the above-described embodiment and can be implemented in various configurations without departing from the technical concept of the present invention. For example, technical features in the embodiment and the modifications corresponding to technical features in the embodiments described in summary section can be replaced or combined as appropriate in order to solve some or all of the problems described above. Unless the technical features are described as essential in the specification, the technical features may be deleted as appropriate.

The invention claimed is:

1. A check valve for a fuel tank, comprising:
   a cover which is to be welded to the fuel tank and has an inflow port configured to allow fuel to flow into the check valve;
   a case which is welded to the cover and has a discharge port configured to discharge the fuel into the fuel tank; and
   a valve body which is configured to open and close the discharge port,
   wherein the cover includes a positioning portion on an outer circumferential surface,
   wherein the case includes a vent hole which is to be arranged upward in a circumferential direction of the case when the check valve is mounted on the fuel tank, and a valve body supporting portion which supports the valve body inside the case,
   wherein the valve body supporting portion includes a selecting portion for positioning the vent hole, and the selecting portion is provided on a discharge port side of the valve body supporting portion at a position away from the positioning portion by a predetermined angle in the circumferential direction of the case, and
   wherein the valve body supporting portion includes a connecting portion formed to extend from an inner circumferential surface of the case to a center thereof, and the selecting portion is provided at the connecting portion.

2. The check valve according to claim 1,
   wherein the selecting portion is formed on a discharge port side end surface of the connecting portion.

\* \* \* \* \*